US012726943B2

(12) United States Patent
Lim et al.

(10) Patent No.: US 12,726,943 B2
(45) Date of Patent: Sep. 1, 2026

(54) USER EQUIPMENT PAGING MONITORING

(71) Applicant: Intel Corporation, Santa Clara, CA (US)

(72) Inventors: Seau S. Lim, Swindon (GB); Sudeep K. Palat, Cheltenham (GB)

(73) Assignee: Intel Corporation, Santa Clara, CA (US)

( * ) Notice: Subject to any disclaimer, the term of this patent is extended or adjusted under 35 U.S.C. 154(b) by 293 days.

(21) Appl. No.: 18/562,132

(22) PCT Filed: Oct. 11, 2022

(86) PCT No.: PCT/US2022/046229
§ 371 (c)(1),
(2) Date: Nov. 17, 2023

(87) PCT Pub. No.: WO2023/064243
PCT Pub. Date: Apr. 20, 2023

(65) Prior Publication Data

US 2024/0292371 A1 Aug. 29, 2024

Related U.S. Application Data

(60) Provisional application No. 63/255,894, filed on Oct. 14, 2021.

(51) Int. Cl.
*H04W 68/00* (2009.01)
*H04W 36/00* (2009.01)
*H04W 68/02* (2009.01)

(52) U.S. Cl.
CPC ......... *H04W 68/005* (2013.01); *H04W 36/00* (2013.01); *H04W 68/025* (2013.01)

(58) Field of Classification Search
CPC . H04W 68/005; H04W 36/00; H04W 68/025; H04W 76/27; H04W 8/24
See application file for complete search history.

(56) References Cited

U.S. PATENT DOCUMENTS

2019/0124181 A1* 4/2019 Park ...................... H04W 76/27
2022/0070783 A1* 3/2022 Hsieh ................ H04W 52/0235
(Continued)

FOREIGN PATENT DOCUMENTS

CN 113163476 A 7/2021
CN 117643123 3/2024
WO WO-2023064243 A1 4/2023

OTHER PUBLICATIONS

"International Application Serial No. PCT/US2022/046229, International Search Report mailed Jan. 31, 2023", 4 pgs.
(Continued)

*Primary Examiner* — William G Trost, IV
(74) *Attorney, Agent, or Firm* — Schwegman Lundberg & Woessner, P.A.

(57) ABSTRACT

An apparatus and system of paging using paging early indication (PEI) and subgrouping are described. A fifth generation nodeB (gNB) checks paging information of a UE from a limited paging container of the UE provided from the core network to determine whether PEI/subgrouping information is present. The limited paging container contains paging information of the UE that is provided in the UE capability and is used by a previous gNB. If the paging information of the UE does not indicate the ability of the UE
(Continued)

to use PEI and/or subgrouping, the gNB checks the information in the UE capability; if the paging information and the UE capability conflict, the gNB signals the UE to monitor for PEI/Subgrouping. The gNB updates the paging capability with PEI and/or subgrouping support before the UE enters idle mode or inactive state and sends the update to the core network.

20 Claims, 6 Drawing Sheets

(56) References Cited

U.S. PATENT DOCUMENTS

| | | | | |
|---|---|---|---|---|
| 2022/0264516 | A1* | 8/2022 | He | H04W 76/27 |
| 2023/0126745 | A1* | 4/2023 | Sha | H04W 76/28 370/329 |
| 2023/0144750 | A1* | 5/2023 | Agiwal | H04W 48/14 455/422.1 |
| 2024/0163846 | A1* | 5/2024 | Sheng | H04W 68/025 |
| 2024/0196371 | A1* | 6/2024 | Lauridsen | H04W 68/02 |
| 2024/0323914 | A1* | 9/2024 | Wu | H04W 68/005 |

OTHER PUBLICATIONS

"International Application Serial No. PCT/US2022/046229, Written Opinion mailed Jan. 31, 2023", 4 pgs.

Intel Corporation, "Further considerations on the Network assigned subgrouping", R2-2107549, 3GPP TSG RAN WG2 Meeting #115-e, E-Meeting, (Aug. 6, 2021), 6 pgs.

Intel Corporation, "Procedure details for Network assigned subgrouping", R2-2102871, 3GPP TSG RAN WG2 Meeting #113bis-e, E-Meeting, (Apr. 2, 2021), 4 pgs.

LG Electronics Inc, "UE subgrouping for paging enhancement", R2-2106349, 3GPP TSG-RAN WG2 Meeting #114 electronic, Online, (May 11, 2021), 3 pgs.

Qualcomm Incorporated, "Use of the UE's Radio Capability for Paging in RRC_Jnactive", R3-211621, 3GPP TSG-RAN WG3 Meeting#112-e, (May 6, 2021), 5 pgs.

"U.S. Appl. No. 18/562,132, Preliminary Amendment filed Nov. 17, 2023", 8 pages.

"International Application Serial No. PCT US2022 046229, International Preliminary Report on Patentability mailed Apr. 25, 2024", 6 pgs.

"Korean Application Serial No. 10-2023-7045206, Voluntary Amendment Filed Oct. 10, 2025", w with English Claims, 14 pgs.

* cited by examiner

USER EQUIPMENT PAGING MONITORING

PRIORITY CLAIM

This application is a U.S. National Stage Filing under 35 U.S.C. 371 from International Application No. PCT/US2022/046229, filed Oct. 11, 2022 and published in English as WO 2023/064243 on Apr. 20, 2023, which claims the benefit of priority to U.S. Provisional Patent Application Ser. No. 63/255,894, filed Oct. 14, 2021, each of which is incorporated herein by reference in its entirety.

TECHNICAL FIELD

Embodiments pertain to next generation (NG) wireless networks. In particular, some embodiments relate to paging monitoring by user equipment (UE). Some embodiments relate to paging monitoring based on Paging Early Indication (PEI) or subgroup.

BACKGROUND

The use and complexity of NG or NR wireless systems, which include 5G networks and are starting to include sixth generation (6G) networks among others, has increased due to both an increase in the types of UEs using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology, including complexities related to paging and monitoring of paging signals.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
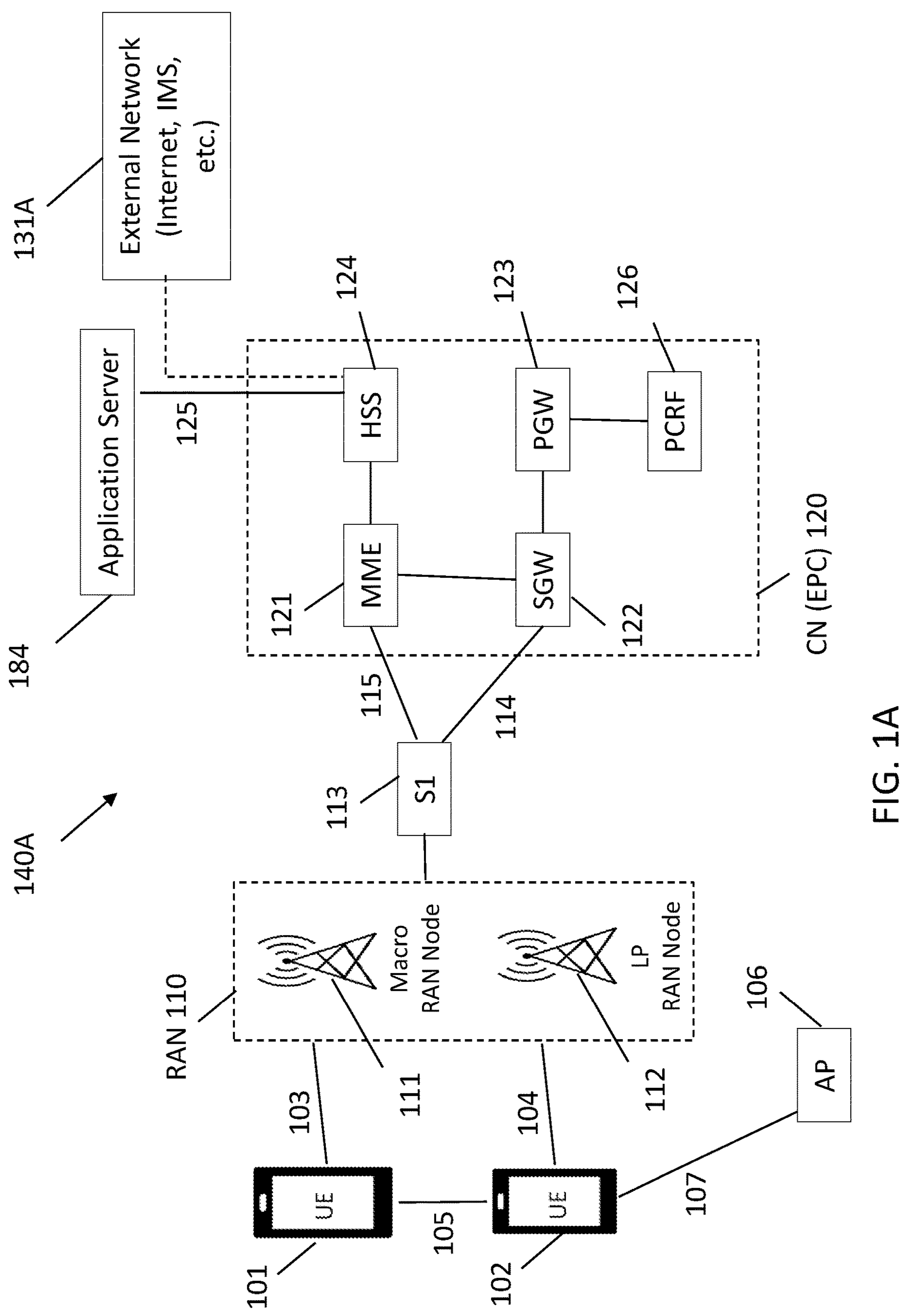
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G and later generation functions. Accordingly, although 5G will be referred to, it is to be understood that this is to extend as able to 6G (and later) structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and other frequencies and Spectrum Access System (SAS) in 3.55-3.7 GHZ and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS)

Terrestrial Radio Access Network (E-UTRAN), a NextGen RAN (NG RAN), or some other type of RAN. The RAN 110 may contain one or more gNBs, one or more of which may be implemented by multiple units. Note that although gNBs may be referred to herein, the same aspects may apply to other generation NodeBs, such as $6^{th}$ generation NodeBs—and thus may be alternately referred to as next generation NodeB (NGNB).

Each of the gNBs may implement protocol entities in the 3GPP protocol stack, in which the layers are considered to be ordered, from lowest to highest, in the order Physical (PHY), Medium Access Control (MAC), Radio Link Control (RLC), Packet Data Convergence Control (PDCP), and Radio Resource Control (RRC)/Service Data Adaptation Protocol (SDAP) (for the control plane/user plane). The protocol layers in each gNB may be distributed in different units—a Central Unit (CU), at least one Distributed Unit (DU), and a Remote Radio Head (RRH). The CU may provide functionalities such as the control the transfer of user data, and effect mobility control, radio access network sharing, positioning, and session management, except those functions allocated exclusively to the DU.

The higher protocol layers (PDCP and RRC for the control plane/PDCP and SDAP for the user plane) may be implemented in the CU, and the RLC and MAC layers may be implemented in the DU. The PHY layer may be split, with the higher PHY layer also implemented in the DU, while the lower PHY layer is implemented in the RRH. The CU, DU and RRH may be implemented by different manufacturers, but may nevertheless be connected by the appropriate interfaces therebetween. The CU may be connected with multiple DUs.

The interfaces within the gNB include the E1 and front-haul (F) F1 interface. The E1 interface may be between a CU control plane (gNB-CU-CP) and the CU user plane (gNB-CU-UP) and thus may support the exchange of signalling information between the control plane and the user plane through E1AP service. The E1 interface may separate Radio Network Layer and Transport Network Layer and enable exchange of UE associated information and non-UE associated information. The E1AP services may be non UE-associated services that are related to the entire E1 interface instance between the gNB-CU-CP and gNB-CU-UP using a non UE-associated signalling connection and UE-associated services that are related to a single UE and are associated with a UE-associated signalling connection that is maintained for the UE.

The F1 interface may be disposed between the CU and the DU. The CU may control the operation of the DU over the F1 interface. As the signalling in the gNB is split into control plane and user plane signalling, the F1 interface may be split into the F1-C interface for control plane signalling between the gNB-DU and the gNB-CU-CP, and the F1-U interface for user plane signalling between the gNB-DU and the gNB-CU-UP, which support control plane and user plane separation. The F1 interface may separate the Radio Network and Transport Network Layers and enable exchange of UE associated information and non-UE associated information. In addition, an F2 interface may be between the lower and upper parts of the NR PHY layer. The F2 interface may also be separated into F2-C and F2-U interfaces based on control plane and user plane functionalities.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signalling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a core network (CN) 120. The NG-RAN 110 can include a plurality of nodes, such as gNBs and NG-eNBs. The CN 120 (e.g., a 5G core network (5GC)) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
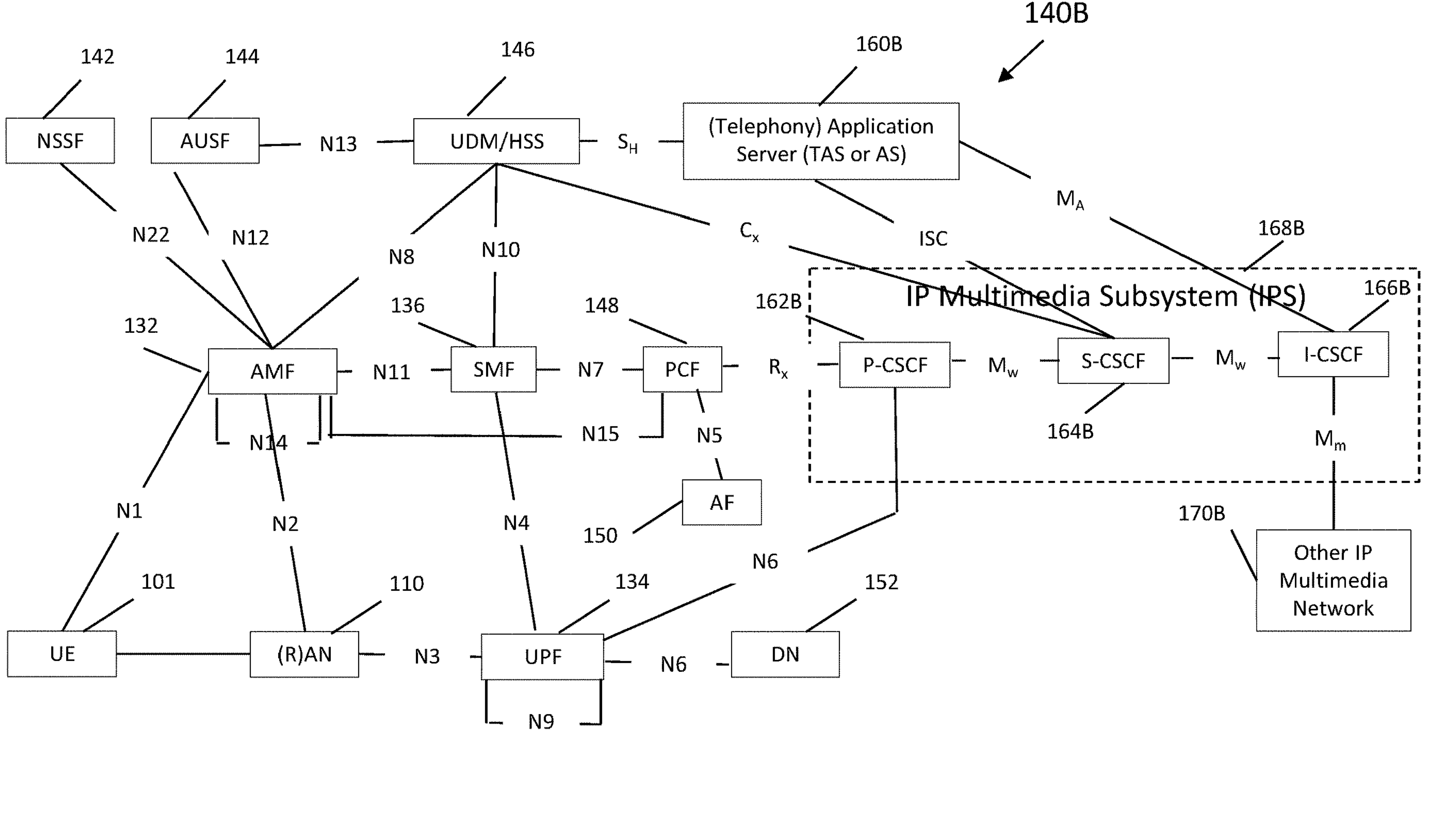
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other CN network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170B, e.g. an IMS operated by a different network operator.

In some aspects, the UDM/HSS 146 can be coupled to an application server (AS) 160B, which can include a telephony application server (TAS) or another application server. The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
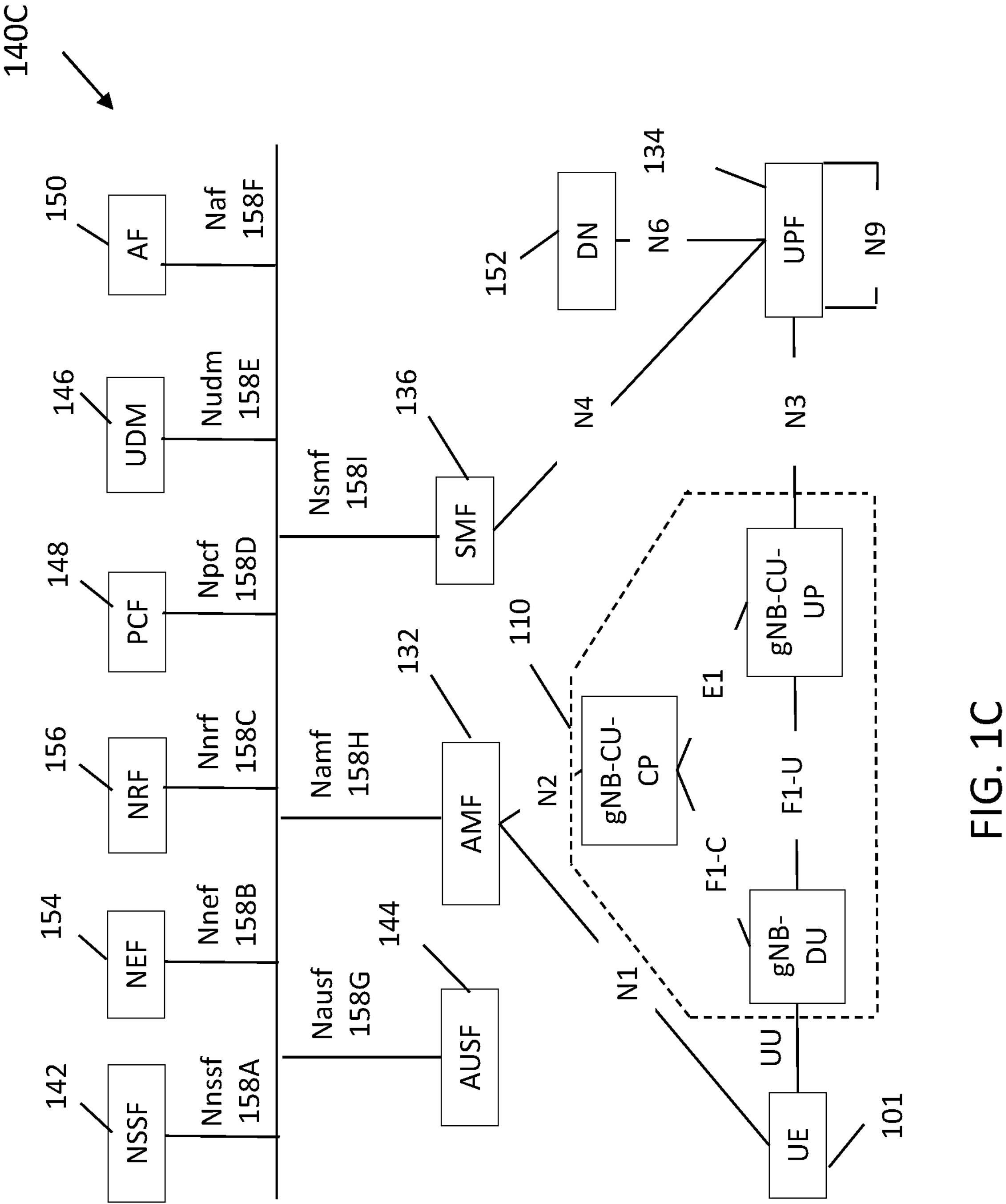
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
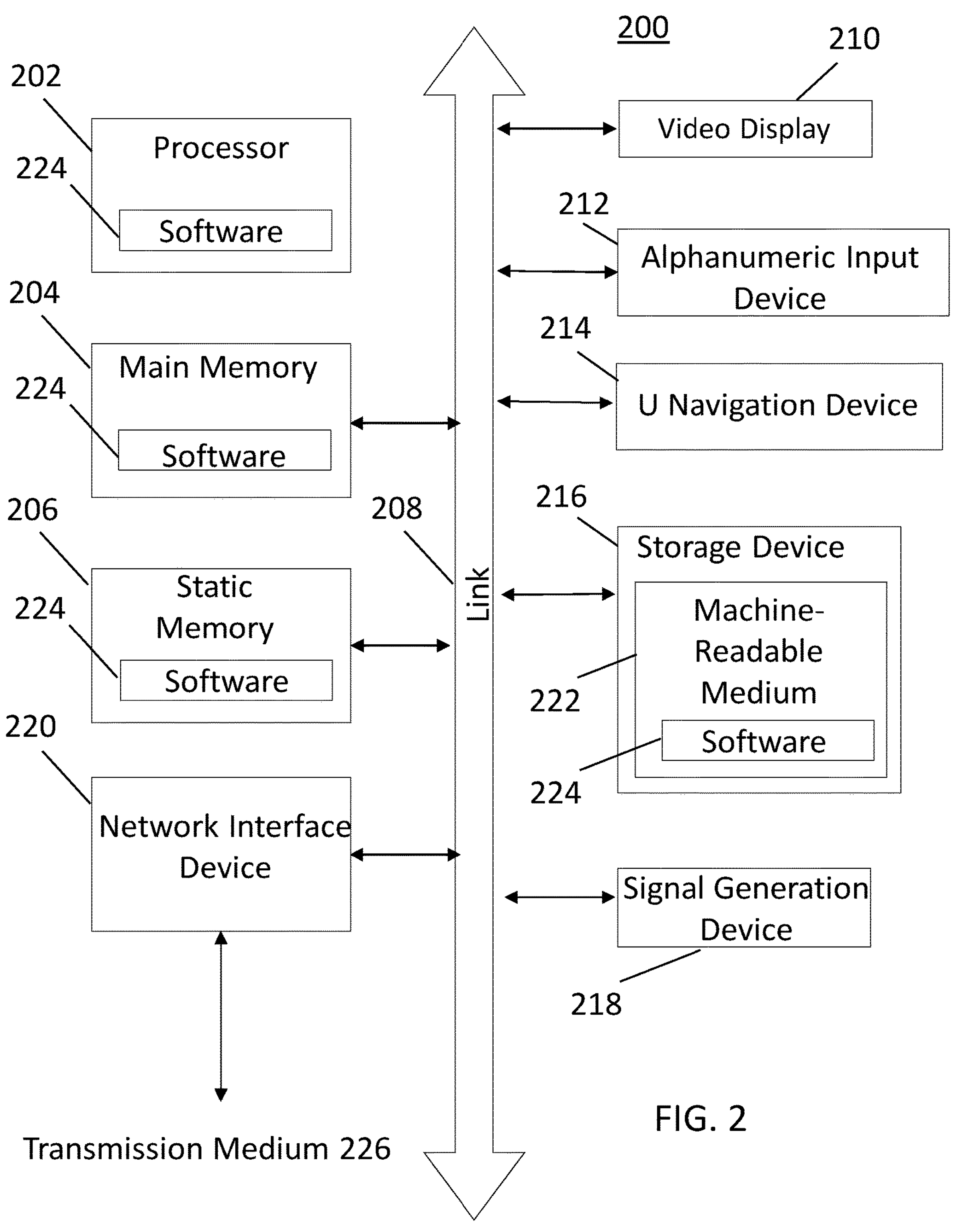
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System)

(W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WIDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (12V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHZ), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHZ and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHZ, 1710-2025 MHz, 2110-2200 MHz, 2300-2400 MHZ, 2.4-2.4835 GHz (note: it is an ISM band with global availability and it is used by Wi-Fi technology family (11b/g/n/ax) and also by Bluetooth), 2500-2690 MHz, 698-790 MHZ, 610-790 MHz, 3400-3600 MHZ, 3400-3800 MHZ, 3800-4200 MHz, 3.55-3.7 GHZ (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHZ (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHZ, 3800-4200 MHZ, 3.5 GHz bands, 700 MHz bands, bands within the 24.25-86 GHz range, etc.), spectrum made available under FCC's "Spectrum Frontier" 5G initiative (including 27.5-28.35 GHZ, 29.1-29.25 GHZ, 31-31.3 GHZ, 37-38.6 GHZ, 38.6-40 GHz, 42-42.5 GHZ, 57-64 GHZ, 71-76 GHZ, 81-86 GHz and 92-94 GHz, etc), the ITS (Intelligent Transport Systems) band of 5.9 GHZ (typically 5.85-5.925 GHZ) and 63-64 GHz, bands currently allocated to WiGig such as WiGig Band 1 (57.24-59.40 GHz), WiGig Band 2 (59.40-61.56 GHZ) and WiGig Band 3 (61.56-63.72 GHZ) and WiGig Band 4 (63.72-65.88 GHZ), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., lowithmedium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

5G networks extend beyond the traditional mobile broadband services to provide various new services such as internet of things (IoT), industrial control, autonomous driving, mission critical communications, etc. that may have ultra-low latency, ultra-high reliability, and high data capacity requirements due to safety and performance concerns. Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, paging is used to by the NG network to indicate various events to the UE. Paging may be used to transmit paging information to a UE in the RRC_IDLE state and RRC_INACTIVE state, inform UEs in the RRC_IDLE state and RRC_INACTIVE state and UEs in the RRC_CONNECTED state about a system information change, indicate an Earthquake and Tsunami Warning System (ETWS) primary notification and ETWS secondary notification, and indicate a Commercial Mobile Alert System (CMAS) notification, among others.

During core network (CN) paging for a UE in the RRC_IDLE state and RRC_INACTIVE state, the UE capability for paging is provided by the CN to the RAN so that the paging RAN knows the UE capability for the paging. The UE capability for paging is provided by the CN to the source RAN before the UE enters the inactive state. During RAN paging for a UE in the inactive mode, the source RAN provides the UE capability for the paging to the target RAN if the target RAN is the paging RAN.

In Rel-17, a paging early indication (PEI) or wake up signal (WUS) with subgrouping was introduced for UE power saving during paging. This capability is included in the UE capability for paging so that the RAN knows whether the UE supports PEI and/or subgrouping during CN or RAN paging.

In Rel-15, the population of the inter-node message for the UE capability for paging (i.e., UERadioPagingInformation) is populated by the RAN; if the RAN does not support PEI and/or subgrouping, the RAN does not include the UE support of PEI and/or subgrouping to UERadioPagingInformation. Hence, during subsequent CN or RAN paging, the paging RAN does not know the exact support of PEI and/or subgrouping by the UE. As a result of this, various issues may occur in NR during CN/RAN paging:

Issue 1: if the first RAN does not support PEI and/or subgrouping and none of the previous RANs support such functionality (i.e., each RAN to which the UE was previously connected), all subsequent CN paging from other RANs may be unable to use PEI and/or subgrouping even if the current RAN supports paging PEI and/or subgrouping. That is, a subsequent RAN (to which the UE is handed over) that supports PEI and/or subgrouping may not be able to use PEI and/or subgrouping for the UE despite the UE being able to support PEI and/or subgrouping. Nor does the UE know whether PEI will be used.

Issue 2: For RAN paging, due to issue 1, if the UERadioPagingInformation received by the source RAN from the CN does not include the UE support of PEI and/or subgrouping, the UE is unable to be paged using PEI and/or subgrouping even if both the UE and the current RAN support such a mode.

Because of the above issues, a RAN that supports PEI and/or subgrouping may not know that the UE supports PEI and/or subgrouping, while the UE is configured to monitor the PEI and/or subgrouping by the serving cell and the UE does not know whether the RAN intends to use the PEI. This may result in paging being missed by a UE as the RAN thinks that the UE is not monitoring PEI and/or subgrouping while the UE is monitoring such paging.

The impact of issues 1 and 2 can be mitigated by different solutions. Solution 0: it is assumed that the network ensures that the PEI and/or subgrouping support is uniform over the registration area.

Solution 1: during CN paging, the CN provides the whole UE Access Stratum (AS) capability container to the RAN and for RAN paging, the source RAN provides the whole UE capability container to the target RAN.

Solution 2: whenever the UE is connected to a RAN that supports PEI and/or subgrouping, the RAN checks whether UERadioPagingInformation includes and aligns to the UE capability on the PEI and/or subgrouping support; if the RAN node supports PEI/subgrouping, the RAN updates UERadioPagingInformation if the PEI and/or subgrouping capability of the UE is not included while the UE supports PEI and/or subgrouping. the RAN then informs the UE over dedicated signalling that the UE is to perform PEI monitoring and/or subgrouping subsequently if the UE's camped cell supports PEI and/or subgrouping. Upon receiving the dedicated signalling, the UE performs PEI monitoring and/or subgrouping subsequently if its camped cell supports PEI and/or subgrouping. In this case, the UE remembers the indication from the RAN until the UE is deactivated (i.e., detaches from the network).

Solution 3: whenever the UE enters the RRC_IDLE state and RRC_INACTIVE state, the RAN informs the UE supporting PEI and/or subgrouping whether to monitor PEI and/or subgrouping during the RRC_IDLE state and RRC_INACTIVE state (if the UE supports PEI and/or subgrouping and the UERadioPagingInformation is included with the PEI and/or subgrouping capability of the UE). In this way, the UE then just retains whether to perform monitoring PEI and/or subgrouping until the next transition to the RRC Connected state, instead of Solution 2 where the UE remembers the indication from the RAN until the UE is deactivated. The UE combines with the support of PEI in the target gNB to make a final decision on whether to use PEI.

Solution 4: instead of RAN informing a UE supporting PEI and/or subgrouping whether to monitor PEI and/or subgrouping during the RRC_IDLE state and RRC_INACTIVE state, the CN informs a UE that enters the RRC_IDLE state and RRC_INACTIVE state.

For Solution 0, the network implementation/deployment may be used to ensure that all the gNBs in a registration area support PEI and/or subgrouping when PEI and/or subgrouping is deployed.

Even though Solution 1 may solve the issues completely, providing the complete UE capability to the RAN during CN paging from the CN to the RAN and RAN paging from the source RAN to the target RAN may create a huge signalling overhead over the network interface.

Figure 3:
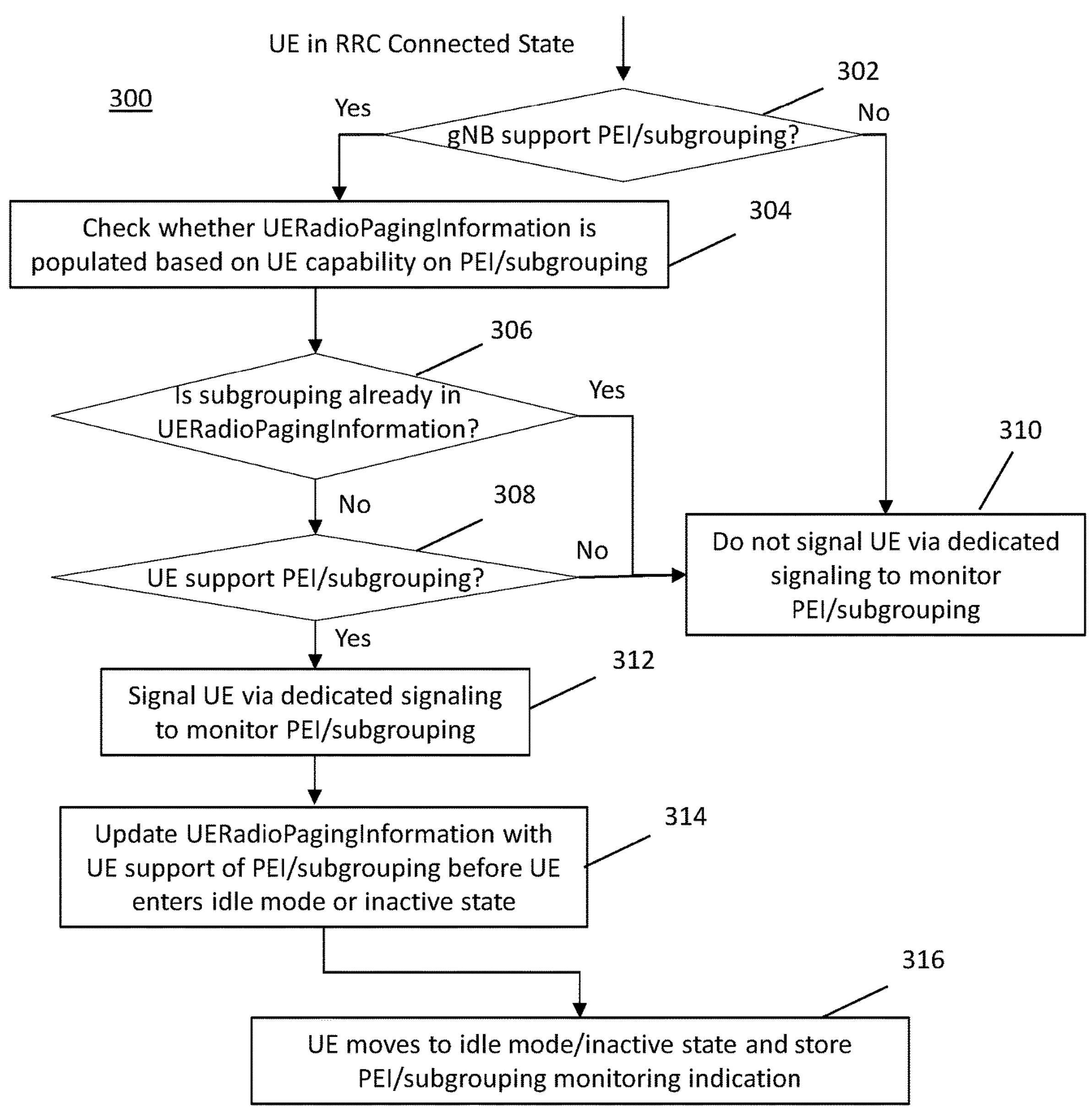
FIG. 3 illustrates a flowchart of a method of PEI and paging subgrouping in accordance with some embodiments.

FIG. 3 illustrates a flowchart of a method of PEI and paging subgrouping in accordance with some embodiments. The flowchart 300 of FIG. 3 provides an overview how Solution 2 works. Additional operations may be present, but are not shown for convenience. At least some of the operations may occur in a different order from that shown in FIG. 3. Note that although a gNB is referred to, any NGNB may be used.

Upon receiving the RRC Connection Resume/Setup Complete from the UE, if the gNB supports PEI and/or subgrouping (yes at operation 302), the gNB checks (determines) whether UERadioPagingInformation (the UE radio paging information, also called UE-RadioPagingInfo) is populated based on the UE capability on PEI/subgrouping at operation 304. That is, the gNB checks the paging information of the UE from the limited paging container provided from the core network to determine whether PEI/subgrouping information is present. The limited paging container contains paging information of the UE (provided in the UE capability) that is used by the previous gNB. Both the paging information of the UE and the full UE capability (i.e., UE capability of the UE capability message provided to the first gNB to which the UE connects) are retained by the gNB and, as above, may conflict. Otherwise (no at operation 302), at operation 310 the gNB may not signal the UE (e.g., via RRC Release) to monitor for PEI/subgrouping.

Step 2: If the PEI and/or subgrouping is not already provided in UERadioPagingInformation (no at operation 306), and the UE supports PEI and/or subgrouping according to the UE capability (yes at operation 308), the RAN signals the UE via dedicated signalling (e.g., RRC Release) to monitor for PEI/Subgrouping at operation 312. That is, if the paging information of the UE does not indicate the ability of the UE to use PEI and/or subgrouping, the gNB checks the information in the full UE capability; if the paging information of the UE (the UERadioPagingInformation) and the full UE capability conflict (the UE capability indicates the ability of the UE to use PEI and/or subgrouping), the RAN signals the UE to monitor for PEI/Subgrouping at operation 312. Otherwise (yes at operation 306 or no at operation 308), as above the RAN may not signal to UE (e.g., via RRC Release) to monitor for PEI/subgrouping at operation 310.

Step 3: The RAN also updates the paging capability of the UE (i.e., UERadioPagingInformation) with UE support of PEI and/or subgrouping before the UE enters the RRC_IDLE state and RRC_INACTIVE state, if it is not already set at operation 314. If the UE enters the RRC_IDLE state or RRC_INACTIVE state (or before), the RAN provides the CN with the updated UERadioPagingInformation at operation 316. That is, the gNB sends to the core network the paging information of the UE indicating the ability of the UE to use PEI and/or subgrouping (in the paging container for the UE).

When the UE receives the dedicated signalling indicating that the UE is to monitor PEI and/or subgrouping, the UE may subsequently monitor PEI and/or subgrouping if the serving cell of the UE is configured to support PEI and/or subgrouping in the broadcast signalling (e.g., indicated by the system information broadcast (SIB)). The UE may store the information until the UE is deactivated (i.e., detached from the network) or is informed to release the information.

With the paging capability of the UE (i.e., UERadioPagingInformation) updated, the issues describe in Section 3.1 may not occur subsequently.

Details of Solution 3:

Instead of the UE having to retain in memory whether the UE is to monitor PEI and/or subgrouping until the UE is deactivated (i.e., detached from the network), solution 3 allows the UE to merely retain such information from the last time the UE entered the RRC_IDLE state and RRC_INACTIVE state. In this case, whenever the UE enters the RRC Connected state, the method of FIG. 3 above is performed by the RAN. The UE combines the stored information with whether the current camped cell supports PEI/subgrouping to determine whether PEI is to be used for the UE.

Figure 4:
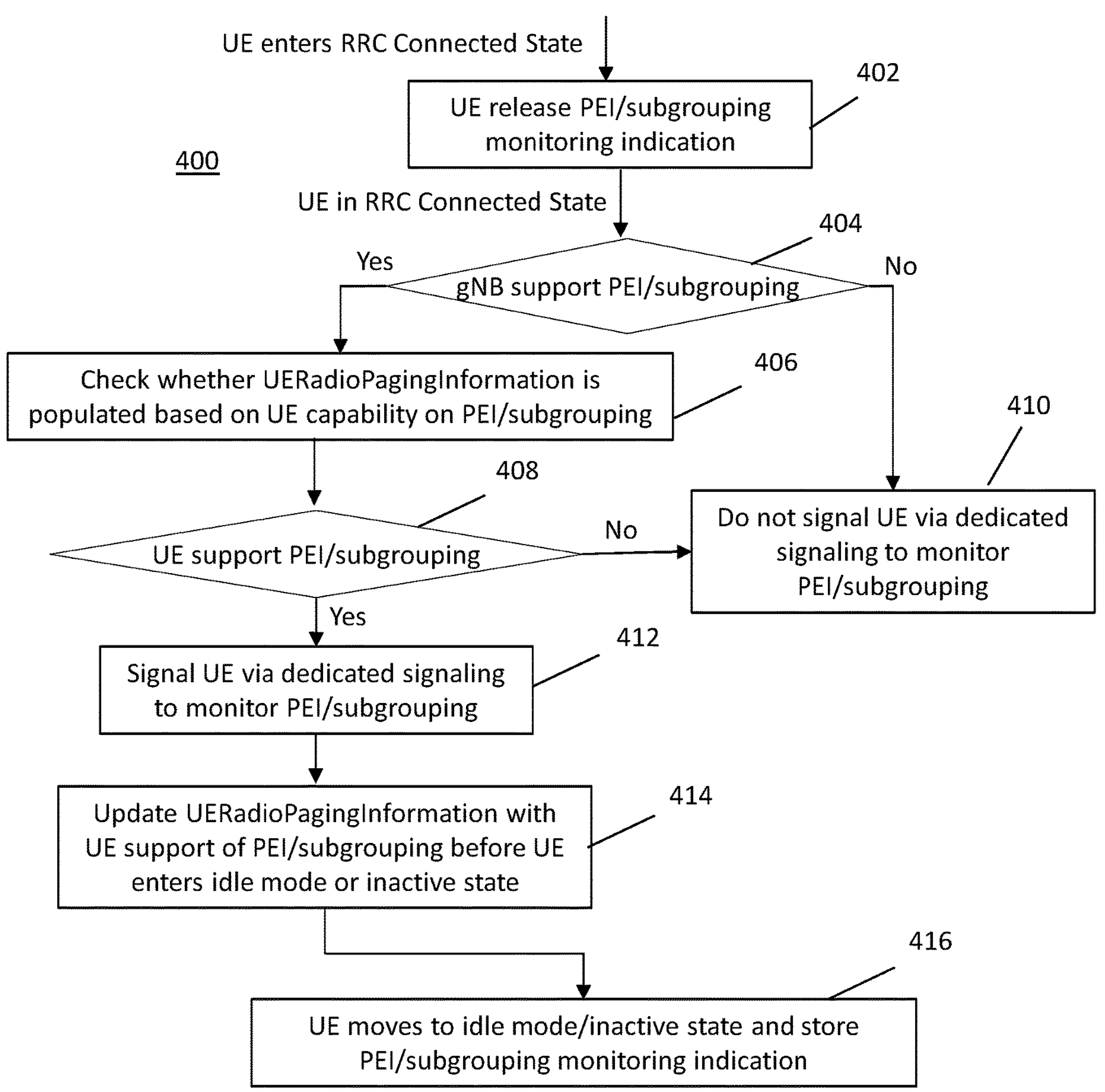
FIG. 4 illustrates a flowchart of another method of PEI and paging subgrouping in accordance with some embodiments.

FIG. 4 illustrates a flowchart of another method of PEI and paging subgrouping in accordance with some embodiments. The flowchart of the method 400 of Solution 3 is illustrated in FIG. 4. As above, additional operations may be present, but are not shown for convenience and at least some of the operations may occur in a different order from that shown in FIG. 4. As above, although a gNB is referred to, any NGNB may be used.

In one embodiment, the UE releases the PEI/subgrouping indication whenever the UE enters connected state at operation 402. That is, the UE assumes the network will provide whether to use PEI/subgrouping subsequently when the UE leaves the RRC_Connected state. The network, however, may not change anything. Whenever the UE enters the RRC_IDLE state and RRC_INACTIVE state, the RAN indicates again whether the UE should monitor PEI/subgrouping subsequently (the same as Solution 2). In another embodiment, the information retained by the UE is based on what the cell supports in the cell in which the UE moved to in the IDLE/INACTIVE mode, and what the cell supports is derived from the information broadcast by the cell.

Details of Solution 4:

Instead of RAN informing the UE supporting PEI and/or subgrouping whether to monitor PEI and/or subgrouping during the RRC_IDLE state and RRC_INACTIVE state, the CN may inform a UE that enters the RRC_IDLE state and RRC_INACTIVE state via a non-Access Stratum (NAS) message (e.g., an Attach Accept, Tracking Area Update Accept) and/or RRC signalling (e.g., RRC Release).

Specifically, when the UE is in the RRC Connected state, upon receiving the RRC Connection Resume/Setup Complete from the UE, if the gNB supports PEI and/or subgrouping (yes at operation 404), the gNB checks whether UERadioPagingInformation is populated based on the Full UE capability at operation 406. Otherwise (no at operation 408), at operation 410 the gNB may not signal the UE (e.g., via RRC Release) to monitor for PEI/subgrouping.

Step 2: If support PEI and/or subgrouping is not already in UERadioPagingInformation and UE does not support PEI/subgrouping (no at operation 408), the RAN does not signal the UE via dedicated signalling (e.g., RRC Release) to monitor PEI/Subgrouping at operation 410. Otherwise (yes at operation 408), as above the RAN signal to UE (e.g., via RRC Release) to monitor for PEI/subgrouping at operation 412.

Step 4: The RAN also updates the paging capability of the UE (i.e., UERadioPagingInformation) with UE support of PEI and/or subgrouping before the UE enters the RRC_IDLE state and RRC_INACTIVE state, if it is not already set at operation 414. If the UE enters the RRC_IDLE state and RRC_INACTIVE state, the RAN provides the CN with the updated UERadioPagingInformation at operation 416.

EXAMPLES

Example 1 is an apparatus for a next generation NodeB (NGNB), the apparatus comprising: memory; and processing circuitry, wherein, for a user equipment (UE) in a Radio Resource Control (RRC) Connected state, the processing circuitry to configure the NGNB to: determine whether UERadioPagingInformation for the UE is populated with at least one of paging early indication (PEI) and subgrouping information; in response to a determination that the UERadioPagingInformation does not indicate support of at least one of PEI and subgrouping, determine based on UE capability of the UE whether the UE supports the at least one of PEI and subgrouping; and in response to a determination, based on the UE capability, that the UE supports the at least one of PEI and subgrouping, signal to the UE to monitor for the at least one of PEI and subgrouping, wherein the memory is configured to store the UERadioPagingInformation.

In Example 2, the subject matter of Example 1 includes, wherein the processing circuitry configures the NGNB to update the UERadioPagingInformation to populate the at least one of PEI and subgrouping information to indicate support of the at least one of PEI and subgrouping in an updated UERadioPagingInformation.

In Example 3, the subject matter of Example 2 includes, wherein the processing circuitry configures the NGNB to send the updated UERadioPagingInformation to the core network before the UE enters an idle mode or inactive state.

In Example 4, the subject matter of Examples 1-3 includes, wherein the processing circuitry configures the NGNB to not signal to the UE to monitor for the at least one of PEI and subgrouping in response to a determination that the UERadioPagingInformation is not populated with the PEI and subgrouping information, and the UE capability indicates that the UE does not support the at least one of PEI and subgrouping.

In Example 5, the subject matter of Examples 1-4 includes, wherein the processing circuitry configures the NGNB to determine whether the NGNB supports the at least one of PEI and subgrouping prior to a determination that the UERadioPagingInformation is populated with the at least one of PEI and subgrouping information to indicate support of the at least one of PEI and subgrouping.

In Example 6, the subject matter of Examples 1-5 includes, wherein the processing circuitry configures the NGNB to not signal to the UE to monitor for the at least one of PEI and subgrouping after a determination that the NGNB does not support the at least one of PEI and subgrouping.

In Example 7, the subject matter of Examples 1-6 includes, wherein the processing circuitry configures the NGNB to use dedicated signalling to signal to the UE to monitor for the at least one of PEI and subgrouping.

In Example 8, the subject matter of Example 7 includes, wherein the dedicated signalling is at least one of a non-Access Stratum (NAS) message or RRC signalling.

In Example 9, the subject matter of Examples 1-8 includes, wherein each time the UE enters the RRC Connected state, the processing circuitry configures the NGNB to: determine whether the UERadioPagingInformation is populated with the at least one of PEI and subgrouping information; in response to the determination that the UERadioPagingInformation does not indicate support of the at least one of PEI and subgrouping, determine based on the UE capability whether the UE supports the at least one of PEI and subgrouping; and in response to a determination, based on the UE capability, that the UE supports the at least one of PEI and subgrouping, signal to the UE to monitor for the at least one of PEI and subgrouping.

In Example 10, the subject matter of Examples 1-9 includes, wherein the UE releases the PEI and subgrouping support indication whenever the UE enters the RRC Connected state.

Example 11 is a non-transitory computer-readable storage medium that stores instructions for execution by one or more processors of a fifth generation (5G) nodeB (gNB), the one or more processors to configure the gNB to, for a user equipment (UE) in a Radio Resource Control (RRC) Connected state, when the instructions are executed: determine whether UERadioPagingInformation for the UE is populated with at least one of paging early indication (PEI) and subgrouping information; in response to a determination that the UERadioPagingInformation does not indicate support of at least one of PEI and subgrouping, determine based on UE capability of the UE whether the UE supports the at least one of PEI and subgrouping; and in response to a determination, based on the UE capability, that the UE supports the at least one of PEI and subgrouping, signal to the UE to monitor for the at least one of PEI and subgrouping.

In Example 12, the subject matter of Example 11 includes, wherein the instructions when executed configure the one or more processors to configure the gNB to: update the UERadioPagingInformation to populate the at least one of PEI and subgrouping information to indicate support of the at least one of PEI and subgrouping in an updated UERadioPagingInformation; and send the updated UERadioPagingInformation to the core network before the UE enters an idle mode or inactive state.

In Example 13, the subject matter of Examples 11-12 includes, wherein the instructions when executed configure the one or more processors to configure the gNB to not signal to the UE to monitor for the at least one of PEI and subgrouping in response to a determination that at least one of: the UERadioPagingInformation is populated with the PEI and subgrouping information, and the UE capability indicates that the UE does not support the at least one of PEI and subgrouping.

In Example 14, the subject matter of Examples 11-13 includes, wherein the instructions when executed configure the one or more processors to configure the gNB to determine whether the NGNB supports the at least one of PEI and subgrouping prior to a determination that the UERadioPagingInformation is populated with the at least one of PEI and subgrouping information to indicate support of the at least one of PEI and subgrouping.

In Example 15, the subject matter of Examples 11-14 includes, wherein the instructions when executed configure the one or more processors to configure the gNB to not signal to the UE to monitor for the at least one of PEI and subgrouping after a determination that the NGNB does not support the at least one of PEI and subgrouping.

In Example 16, the subject matter of Examples 11-15 includes, wherein the instructions when executed configure the one or more processors to configure the gNB to use dedicated signalling to signal to the UE to monitor for the at least one of PEI and subgrouping.

In Example 17, the subject matter of Examples 11-16 includes, wherein each time the UE enters the RRC Connected state, the instructions when executed configure the one or more processors to configure the gNB to: determine whether the UERadioPagingInformation is populated with the at least one of PEI and subgrouping information; in response to the determination that the UERadioPagingInformation does not indicate support of the at least one of PEI and subgrouping, determine based on the UE capability whether the UE supports the at least one of PEI and subgrouping; and in response to a determination, based on the UE capability, that the UE supports the at least one of PEI and subgrouping, signal to the UE to monitor for the at least one of PEI and subgrouping.

Example 18 is an apparatus for a user equipment (UE), the apparatus comprising: memory; and processing circuitry, wherein, in a Radio Resource Control (RRC) Connected state, the processing circuitry to configure the UE to: send, to a first fifth generation (5G) nodeB (gNB), UE capability comprising UERadioPagingInformation populated with at least one of paging early indication (PEI) and subgrouping information, the first gNB being unable to engage in at least one of PEI and subgrouping; monitor for paging without using the at least one of PEI and subgrouping; handover to a second gNB able to engage in at least one of PEI and subgrouping; receive, from the second gNB, a signal to monitor for the at least one of PEI and subgrouping; and after reception of the signal, monitor for paging using the at least one of PEI and subgrouping, wherein the memory is configured to store the UE capacity.

In Example 19, the subject matter of Example 18 includes, wherein the signal is at least one of a non-Access Stratum (NAS) message or RRC signalling.

In Example 20, the subject matter of Examples 18-19 includes, wherein the processing circuitry configures the UE to retain paging information that is based on paging capabilities supported by a cell in which the UE moves to an idle or inactive state, the paging capabilities derived from paging capabilities broadcast by the cell.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a next generation NodeB (NGNB), the apparatus comprising: memory; and processing circuitry, wherein, for a user equipment (UE) in a Radio Resource Control (RRC) Connected state, the processing circuitry to configure the NGNB to:

determine whether UERadioPagingInformation for the UE is populated with at least one of paging early indication (PEI) or subgrouping information;

in response to a determination that the UERadioPagingInformation does not indicate support of at least one of PEI or subgrouping, determine based on UE capability of the UE whether the UE supports the at least one of PEI or subgrouping; and in response to a determination, based on the UE capability, that the UE supports the at least one of PEI or subgrouping, signal to the UE to monitor for the at least one of PEI or subgrouping, wherein the memory is configured to store the UERadioPagingInformation.

2. The apparatus of claim 1, wherein the processing circuitry configures the NGNB to update the UERadioPagingInformation to populate the at least one of PEI or subgrouping information to indicate support of the at least one of PEI or subgrouping in an updated UERadioPagingInformation.

3. The apparatus of claim 2, wherein the processing circuitry configures the NGNB to send the updated UERadioPagingInformation to a core network before the UE enters an idle mode or inactive state.

4. The apparatus of claim 1, wherein the processing circuitry configures the NGNB to not signal to the UE to monitor for the at least one of PEI or subgrouping in response to a determination that the UERadioPagingInformation is not populated with the at least one of PEI or subgrouping information, and the UE capability indicates that the UE does not support the at least one of PEI or subgrouping.

5. The apparatus of claim 1, wherein the processing circuitry configures the NGNB to determine whether the NGNB supports the at least one of PEI or subgrouping prior to a determination that the UERadioPagingInformation is populated with the at least one of PEI or subgrouping information to indicate support of the at least one of PEI or subgrouping.

6. The apparatus of claim 1, wherein the processing circuitry configures the NGNB to not signal to the UE to monitor for the at least one of PEI or subgrouping after a determination that the NGNB does not support the at least one of PEI or subgrouping.

7. The apparatus of claim 1, wherein the processing circuitry configures the NGNB to use dedicated signalling to signal to the UE to monitor for the at least one of PEI or subgrouping.

8. The apparatus of claim 7, wherein the dedicated signalling is at least one of a non-Access Stratum (NAS) message or RRC signalling.

9. The apparatus of claim 1, wherein each time the UE enters the RRC Connected state, the processing circuitry configures the NGNB to:

determine whether the UERadioPagingInformation is populated with the at least one of PEI or subgrouping information;

in response to the determination that the UERadioPagingInformation does not indicate support of the at least one of PEI or subgrouping, determine based on the UE capability whether the UE supports the at least one of PEI or subgrouping; and in response to a determination, based on the UE capability, that the UE supports the at least one of PEI or subgrouping, signal to the UE to monitor for the at least one of PEI or subgrouping.

10. The apparatus of claim 1, wherein the UE releases the at least one of PEI or subgrouping support information whenever the UE enters the RRC Connected state.

11. A non-transitory computer-readable storage medium that stores instructions for execution by one or more processors of a fifth generation (5G) nodeB (gNB), the one or more processors to configure the gNB to, for a user equipment (UE) in a Radio Resource Control (RRC) Connected state, when the instructions are executed:

determine whether UERadioPagingInformation for the UE is populated with at least one of paging early indication (PEI) or subgrouping information;

in response to a determination that the UERadioPagingInformation does not indicate support of at least one of PEI or subgrouping, determine based on UE capability of the UE whether the UE supports the at least one of PEI or subgrouping; and in response to a determination, based on the UE capability, that the UE supports the at least one of PEI or subgrouping, signal to the UE to monitor for the at least one of PEI or subgrouping.

12. The medium of claim 11, wherein the instructions when executed configure the one or more processors to configure the gNB to:

update the UERadioPagingInformation to populate the at least one of PEI or subgrouping information to indicate support of the at least one of PEI or subgrouping in an updated UERadioPagingInformation; and send the updated UERadioPagingInformation to a core network before the UE enters an idle mode or inactive state.

13. The medium of claim 11, wherein the instructions when executed configure the one or more processors to configure the gNB to not signal to the UE to monitor for the at least one of PEI or subgrouping in response to a determination that at least one of: the UERadioPagingInformation is populated with the PEI and subgrouping information, or the UE capability indicates that the UE does not support the at least one of PEI or subgrouping.

14. The medium of claim 11, wherein the instructions when executed configure the one or more processors to configure the gNB to determine whether the gNB supports the at least one of PEI or subgrouping prior to a determination that the UERadioPagingInformation is populated with the at least one of PEI or subgrouping information to indicate support of the at least one of PEI or subgrouping.

15. The medium of claim 11, wherein the instructions when executed configure the one or more processors to configure the gNB to not signal to the UE to monitor for the at least one of PEI or subgrouping after a determination that the gNB does not support the at least one of PEI or subgrouping.

16. The medium of claim 11, wherein the instructions when executed configure the one or more processors to configure the gNB to use dedicated signalling to signal to the UE to monitor for the at least one of PEI or subgrouping.

17. The medium of claim 11, wherein each time the UE enters the RRC Connected state, the instructions when executed configure the one or more processors to configure the gNB to:

determine whether the UERadioPagingInformation is populated with the at least one of PEI or subgrouping information;

in response to the determination that the UERadioPagingInformation does not indicate support of the at least one of PEI or subgrouping, determine based on the UE capability whether the UE supports the at least one of PEI or subgrouping; and in response to a determination, based on the UE capability, that the UE supports the at least one of PEI or subgrouping, signal to the UE to monitor for the at least one of PEI or subgrouping.

18. An apparatus for a user equipment (UE), the apparatus comprising: memory; and processing circuitry, wherein, in a Radio Resource Control (RRC) Connected state, the processing circuitry to configure the UE to:

send, to a first fifth generation (5G) nodeB (gNB), UE capability comprising UERadioPagingInformation populated with at least one of paging early indication (PEI) or subgrouping information, the first gNB being unable to engage in at least one of PEI or subgrouping;

monitor for paging without using the at least one of PEI or subgrouping;

handover to a second gNB able to engage in at least one of PEI or subgrouping;

receive, from the second gNB, a signal to monitor for the at least one of PEI or subgrouping; and after reception of the signal, monitor for paging using the at least one of PEI or subgrouping, wherein the memory is configured to store the UE capability.

19. The apparatus of claim 18, wherein the processing circuitry configures the UE to retain paging information that is based on paging capabilities supported by a cell in which the UE moves to an idle or inactive state, the paging capabilities derived from paging capabilities broadcast by the cell.

20. The apparatus of claim 1, wherein the processing circuitry configures the NGNB to, in response to reception from the UE of at least one of an RRC Connection Resume Complete message and an RRC Setup Complete message, determine whether the UERadioPagingInformation for the UE is populated with the at least one of PEI or subgrouping information.

* * * * *